United States Patent [19]

Murphy, Jr. et al.

[11] Patent Number: 5,281,973
[45] Date of Patent: Jan. 25, 1994

[54] LOCAL OSCILLATOR FREQUENCY CONTROL MEANS FOR SEMIACTIVE MISSILE GUIDANCE AND CONTROL SYSTEM

[75] Inventors: William M. Murphy, Jr., Wellesley; Eugene J. Gentuso, Medford, both of Mass.

[73] Assignee: Raytheon Company, Lexington, Mass.

[21] Appl. No.: 984,014

[22] Filed: Nov. 30, 1992

Related U.S. Application Data

[63] Continuation of Ser. No. 19,179, Mar. 13, 1970, abandoned.

[51] Int. Cl.$^5$ .................................................. F41G 7/28
[52] U.S. Cl. .................................... 342/62; 244/3.13; 342/100
[58] Field of Search ............... 102/214; 244/3.11, 3.13, 244/3.14, 3.19; 342/62, 68, 73, 98, 100, 103, 418

[56] References Cited

U.S. PATENT DOCUMENTS

| | | | |
|---|---|---|---|
| 2,977,465 | 3/1961 | Sanders et al. | 455/146 |
| 3,212,083 | 10/1965 | Hinchman | 244/3.11 |
| 3,363,858 | 1/1968 | Dobbins et al. | 244/3.14 |
| 3,713,155 | 1/1973 | Jaffe | 243/92 |
| 3,733,604 | 5/1973 | Smith | 342/62 |

OTHER PUBLICATIONS

Ivanov, Alex, "Radar Guidance of Missiles," IEEE International Radar Conference, Arlington, Calif., Apr. 21-23, 1975, pp. 331-335.

*Primary Examiner*—Stephen C. Bentley
*Attorney, Agent, or Firm*—Donald F. Mofford; Richard M. Sharkansky

[57] ABSTRACT

A target tracking radar receiver for use in a semiactive tracking system wherein elevation angle data, azimuth angle data and Doppler frequency shift data are processed in a manner which enables narrow band filtering of target angle tracking data in the first intermediate frequency stage. The receiver is arranged to track, simultaneously, variations of target Doppler frequency and of transmitter frequency to permit the desired early narrow band filtering of the received angle data.

3 Claims, 2 Drawing Sheets

LOCAL OSCILLATOR FREQUENCY CONTROL MEANS FOR SEMIACTIVE MISSILE GUIDANCE AND CONTROL SYSTEM

The invention herein described was made in the course of or under a contract or subcontract thereunder, with the Department of Defense.

This application is a continuation of application Ser. No. 05/019,179 filed Mar. 13, 1970 now abandoned.

BACKGROUND OF THE INVENTION

This invention pertains generally to tracking and guidance systems, and particularly to systems wherein radar signals from a transmitter are utilized to control an intercept of a target by a missile.

It is known in the art that so-called "semiactive" tracking and guidance systems have wide application for controlling the intercept of a target by a missile. A "semiactive" system is one in which both a target of interest and a missile are illuminated with radio frequency energy from a radar. A portion of the energy reflected from the target is received at the missile along with energy directly transmitted from the radar. Upon processing of such signals in the missile, guidance signals are produced which cause the missile to intercept the target. The guidance signals are azimuth angle, elevation angle and their rates and target-missile closing velocity.

While a semiactive system maintains its accuracy and dependability to the maximum range of the radar, experience has proven that operating conditions may present difficulties which mitigate against performance at all times. Major operating conditions which mitigate against performance are feedthrough, ground clutter return and noise. The return clutter signals and noise are processed in combination with the target tracking signals so that large amounts of return clutter tend to saturate processing elements. This saturation affects the linearity of the receiver, and thereby can cause an incorrectable error or degradation in the measured directional information.

SUMMARY OF THE INVENTION

Therefore, it is a primary object of this invention to provide an improved system for semiactive tracking of a target and guidance of a missile to accomplish an intercept.

Another object of this invention is to reduce the saturation effect of large amounts of clutter return or noise received by the system to a greater degree than heretofore.

These and other objects of the invention are attained generally by tracking the Doppler frequency shifts caused by relative motion between a radar transmitter, a missile and a target and the radar transmitter frequency variations of such transmitter to derive control signals for a common microwave local oscillator in a receiver. When the output signals of such local oscillator are mixed, in separate mixers, with radio frequency signals received by the missile's target tracking antenna and with radio frequency signals received by the missile's reference frequency antenna, the resulting intermediate frequency signals are processed to produce appropriate control signals which, in turn, vary the frequency of the common microwave local oscillator in such a way that the intermediate frequency signals resulting from radio frequency signals received by the missile's target tracking antenna are substantially constant in frequency regardless of changes in Doppler shifts or transmitted frequency.

BRIEF DESCRIPTION OF THE DRAWINGS

For a more complete understanding of this invention, reference is now made to the following description of a preferred embodiment and to the drawings, in which.

DESCRIPTION OF THE PREFERRED EMBODIMENTS

Figure 1:
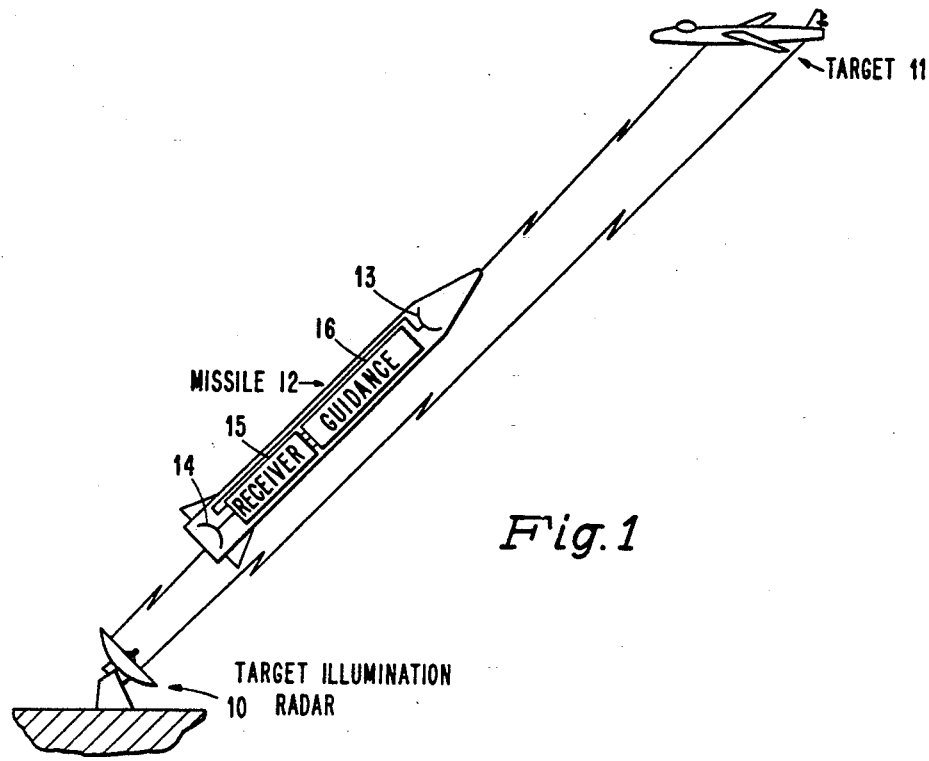
FIG. 1 illustrates an application of the invention to a semiactive radar missile system.

Referring now to FIG. 1, it will first be noted that the particular embodiment shown is a semiactive radar missile system. Thus, a target illumination radar 10 (which may be either a pulse, CW, or pulsed Doppler radar transmitter, not shown), a reflecting target 11 and a missile 12 are shown in relative positions as in an intercept. The missile 12 contains: A target tracking antenna 13 capable of receiving energy reflected by the illuminated target 11 as well as clutter return signals and noise (not shown); a reference frequency antenna 14 capable of receiving energy directly from the target illumination radar 10; a receiver 15 capable of processing the energy received by the target tracking radar 13 and the reference frequency antenna 14 in a manner to provide command signals to the guidance system 16. The latter system, being of conventional construction, will not be described in detail. The guidance signals typically represent the azimuth angle and elevation angle, or rate of change thereof, between the target 11 and the boresight of the target tracking antenna 13 and the closing velocity of the missile 12 and the target 11 as determined by Doppler frequency shift principles. The guidance system 16 provides input signals to the servo control system (not shown) of the target tracking antenna 13 and to aerodynamic controls (not shown) of the missile 12 so as to maintain the target 11 within the antenna field of view and cause the missile 12 to intercept the target 11.

Figure 2:
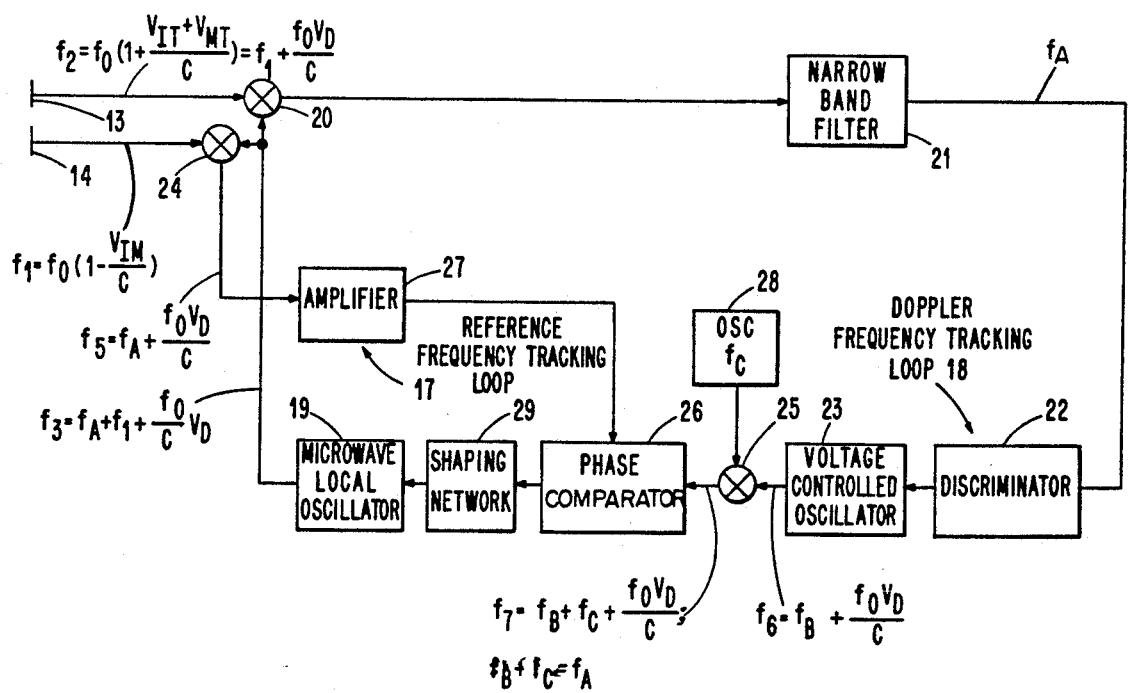
FIG. 2 is a simplified block diagram of the receiver shown in FIG. 1.

Referring now to FIG. 1 and FIG. 2, it may be seen that a portion of the radio frequency energy radiated by the target illumination radar 10 in FIG. 1 is received by the missile's reference frequency antenna 14, there appearing as a signal at a frequency $f_1$. The frequency $f_1$ is equal to the transmitted frequency, $f_0$, of such radar, changed, in accordance with the Doppler principle by an amount, $f_0 V_{IM}/c$, (where c is the speed of light and where $V_{IM}$ = relative velocity between the target illumination radar 10 and the missile 12). Therefore, in the illustrated case, $f_1 = f_0(1 - V_{IM}/c)$. The radio frequency target reflected by the illuminated target 11 is received by the target tracking antenna 13 and appears as a signal at a frequency $f_2$. The frequency $f_2$ is equal to the frequency, $f_0$, transmitted from the target illumination radar 10 shifted by the Doppler principle an amount $f_0(V_{IT} + V_{MT})/c$, where $V_{IT}$ is the relative velocity between such radar and target, and $V_{MT}$ is the relative velocity between the missile 12 and such target. Therefore, in the illustrated case, $$f_2 = f_0(1 + (V_{IT} + V_{MT})/c) = f_1 + f_0 V_D/c$$

where $V_D = V_{IM} + V_{IT} + V_{MT}$

In other words, the frequency of the signals from the illuminated target 11, as such signals are received by the target tracking antenna 13, is a function of the transmitted frequency, $f_0$, the relative velocity, $V_{IT}$, between the target illumination radar 10 and the illuminated target 11 and the relative velocity, $V_{MT}$, between such target and the missile 12. Likewise, the frequency of the signals from the target illumination radar 10, as such signals are received by the reference frequency antenna 14, is a function of the transmitted frequency $f_0$, and the relative velocity, $V_{IM}$, between the target illumination radar 10 and the missile 12. It follows then that, if narrow band intermediate frequency signals having a predetermined center frequency, $f_A$, are to be derived by heterodyning the signals received by the target tracking antenna 13, changes in the just-mentioned independent parameters, i.e. $f_0$, $V_{IT}$, $V_{MT}$ and $V_{IM}$, the frequency of a local oscillator, here microwave local oscillator 19, must be varied in accordance with frequency variations in such parameters, here $f_3 = f_A + f_1 + f_0 V_D/c$. In the present case, such frequency variations actuate a first and a second control loop, hereinafter referred to, respectively, as the reference frequency control loop 17 and the Doppler frequency tracking loop 18.

Referring now to FIG. 2 in particular, it may be seen that the input signals to the Doppler frequency tracking loop 18 are in fact intermediate frequency signals derived from the signals received by the target tracking antenna 13 by conventional heterodyning in a balanced mixer 20 and a narrow band filter 21. The latter element conveniently is an intermediate frequency amplifier having a center frequency $f_A$ and a bandwidth less than the difference between the frequency of the microwave local oscillator 19 and the frequency of the signal received by the target tracking antenna 13.

The signals produced by narrow band filter 21 are used to control the Doppler frequency tracking loop 18 through a discriminator 22. Discriminator 22, with center frequency $f_A$, is used to control a voltage controlled oscillator 23 which produces signals at a nominal frequency $f_0 = f_B + f_0 V_D/c$ where $f_B$ is a fixed known frequency. The signals produced by microwave local oscillator 19 are also heterodyned in a balanced mixer 24 with signals received by the reference frequency antenna 14. The resulting signals include a frequency $f_5 = f_A + f_0 V_D/c$. These signals are filtered by a broadband amplifier 27 which has its bandpass centered at a frequency $f_A$, and a bandwidth greater than 2 $f_0$ (max.) $V_D$ (max.)/c, where $V_D$ max. is the greatest expected closing velocity and $f_0$ max. is the highest expected transmission frequency, but less than 2 $f_0$. The resulting signals from amplifier 27 are applied to phase comparator 26. The signals produced by voltage controlled oscillator 23 are translated in frequency an amount $f_C$ by local oscillator 28 and balanced mixer 25 to produce signals at a frequency $f_7 = f_B + f_C + f_0 V_D/c$. The frequencies $f_B$ and $f_C$ are selected such that $f_B + f_C = f_A$. The signals produced by balanced mixer 25 are, therefore, at the same frequency of the signal processed by amplifier 27, that is $f_A + f_0 V_D/c$. The signals from phase comparator 26, in combination with shaping network 29, are used to control microwave local oscillator 19. The latter conveniently may be a detector and integrating circuit.

Therefore, if the receiver is tracking the target Doppler frequency, $f_0/c V_D$, and the transmitter frequency $f_0$, phase comparator 26 will have applied to it two signals related in phase with each other. Consequently, in this tracking condition the microwave local oscillator 19 will generate a signal at a frequency equal to its nominal frequency, $f_A + (f_1 + f_0 V_D/c)$ and voltage controlled oscillator 23 will generate a signal equal to its nominal frequency, $f_B + f_0 V_D/c$. Since $f_B$ is a known frequency, $V_D$ can be determined by the frequency of the signal generated by voltage controlled oscillator 23. If either the transmission frequency, $f_0$, or the Doppler frequency, $f_0 V_D/c$, change, signals $f_5$ and $f_7$ develop a relative phase change to produce voltage control signal to microwave local oscillator 19 to reflect the changed conditions and thereby maintain the system in continuous track of transmission and Doppler frequencies.

As described above, the invention processes R.F. energy received by the target tracking antenna 13 in a manner whereby the angle data signal is at a fixed frequency, $f_A$, at the first I.F. stage. This enables narrow band filtering of the missile target tracking data to reduce the amount of received clutter return, feedthrough and other interfering signals passing to the remaining processing elements.

While it is observed that the bandwidth of the reference frequency tracking loop 17 is wide enough to accommodate variations in Doppler frequency, the signals received by the reference frequency antenna 14 are relatively noise-free as compared to the signals received by the target tracking antenna 13. The signals at the reference frequency antenna 14 are, typically, affected only by noise and missile motor plume effects, both of which are small compared with target noise, feedthrough and clutter which typically affect the signals at the target tracking antenna 13.

As is obvious to one skilled in the art, microwave local oscillator 19 will generate F.M. noise sidebands in addition to a signal at frequency $f_A + f_1 + f_0 V_D/c$. It is desirable to suppress the F.M. sidebands in a "feedthrough-clutter" environment. The suppression is accomplished by employing a reference frequency tracking loop 17 with a bandwidth sufficiently large to: (1) reduce the F.M. sidebands to a level equal to or less than the Doppler return, and (2), reproduce the F.M. noise "characteristics" of the transmitter.

Figure 3:
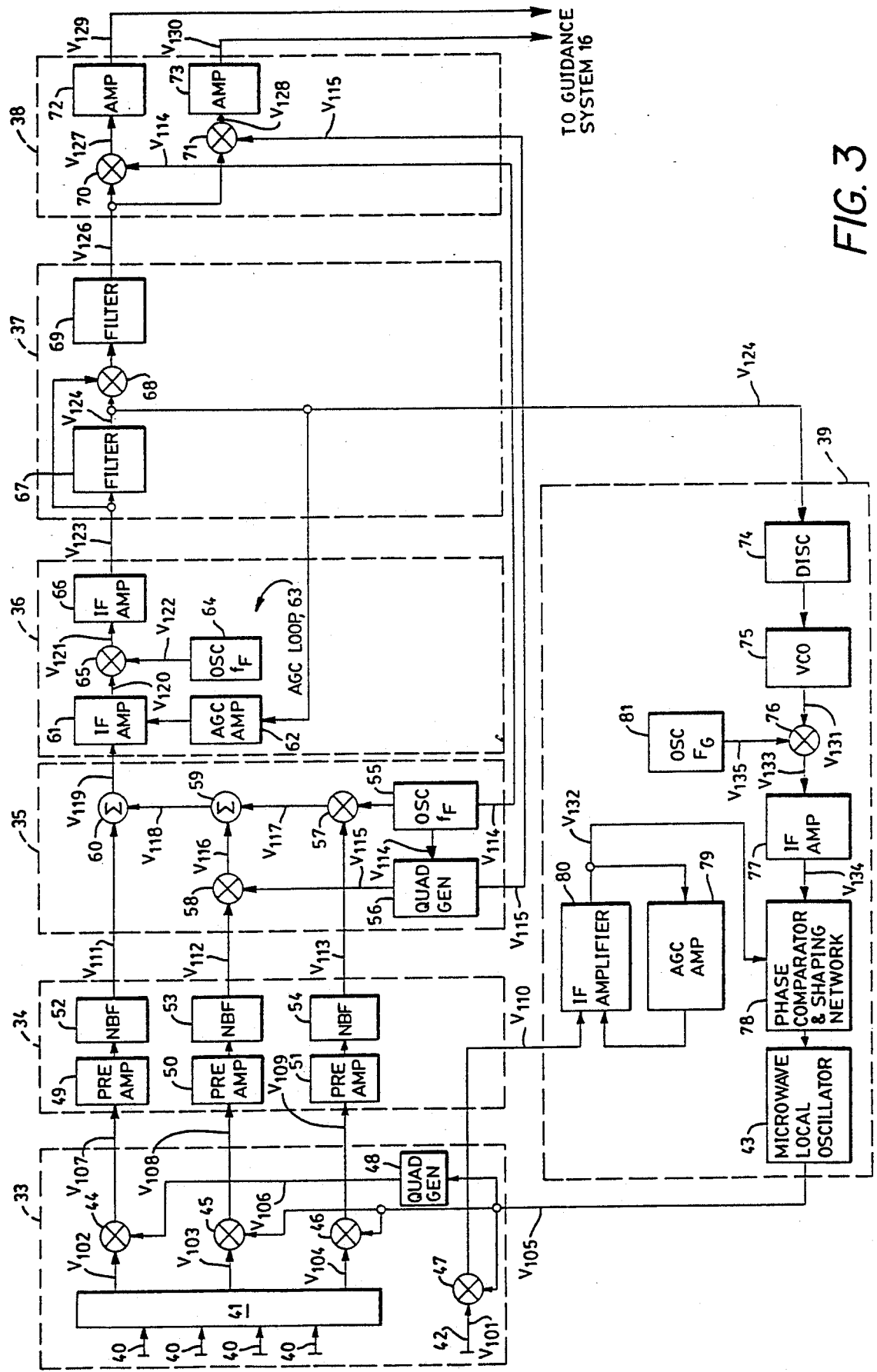
FIG. 3 is a block diagram of the invention applied to a phase monopulse CW radar system employing an amplitude modulation coding technique.

Referring to FIG. 3, a block diagram of the invention applied to a monopulse C.W. radar system employing an amplitude modulation coding scheme is shown to include: A microwave section 33, narrow band filtering section 34 wherein the I.F. signals produced by the antenna section 33 are narrow band filtered; amplitude modulation (AM) section 35 wherein the azimuth difference signal, $\Delta_{AZ}$, elevation difference signal, $\Delta_{EL}$, are superimposed in quadrature with each other as sideband signals to the sum signal, $\Sigma$; receiver gain normalization section 36, wherein the receiver gain is normalized by $\Sigma$; AM detection section 37 wherein the sidebands which represent $\Delta_{AZ}$ and $\Delta_{EL}$ are detected; quadrature detection section 38 wherein the elevation angle data $e_p$, and the azimuth angle data, $e_y$, are determined; and the Doppler and reference frequency tracking loop section 39 wherein the Doppler frequency and transmission frequency are tracked.

The target tracking antenna 40 in microwave section 33 is comprised of four receiving elements arranged consistent with the description of a phase monopulse antenna presented in *Microwave Journal*, October and November, 1959, pp. 28, FIG. 1. The monopulse addition and subtraction processing is performed in the monopulse arithmetic section 41 in a conventional manner by microwave elements such as a ring of "rat races" or "Magic T's" as described in *Introduction to Radar Systems* by Merrill I. Skolnik, McGraw-Hill Book Company, Inc., 1962, pg. 176. The resulting R.F. signals can be represented as:

$$V_{102} = \Sigma = a(t)\cos 2\pi f_o \left(1 + \frac{V_{IT} + V_{MT}}{c}\right)t = a(t)\cos 2\pi \left(f_1 + \frac{f_o}{c} V_D\right)t$$

$$V_{103} = D_{AZ} = e_y a(t)\sin 2\pi f_o \left(1 + \frac{V_{IT} + V_{MT}}{c}\right)t = e_y a(t)\sin 2\pi \left(f_1 + \frac{f_o}{c} V_D\right)t$$

$$V_{104} = D_{EL} = e_p a(t)\sin 2\pi f_o \left(1 + \frac{V_{IT} + V_{MT}}{c}\right)t = e_p a(t)\sin 2\pi \left(f_1 + \frac{f_o}{c} V_D\right)t$$

where:
$V_{102}$ is the sum signal;
$V_{103}$ is the azimuth difference signal;
$V_{104}$ is the elevation difference signal.
Therefore:
$a(t)$ represents the reference signal envelope;
$e_p$ represents elevation angle
$e_y$ represents azimuth angle as described briefly in Skolnik, pg. 181, including E.q. 5.31.

The signal received by the reference frequency antenna 42 can be represented as $$V_{101} = a_{21}(t)\cos 2\pi f_o \left(1 - \frac{V_{IM}}{c}\right)t = a_{21}(t)\cos 2\pi f_1 t$$

where $a_{21}(t)$ is a quantity related to the reference frequency signal envelope.

Microwave local oscillator 43, which may typically be a solid state oscillator or klystron, produces a nominal signal represented by:

$$V_{105} = \sin 2\pi \left(f_A + f_1 + \frac{f_o}{c} V_D\right)t$$

which is heterodyned with the signals produced by the monopulse arithmetic section 41 in balanced mixers 44, 45 and 46. However, before heterodyning with the sum signal, $V_{102}$, in balanced mixer 44, the microwave local oscillator output signal $V_{105}$ is shifted in phase 90° by quadrature generator 48 thereby producing a signal $V_{106}$ which can be represented by $$V_{106} = \cos 2\pi \left(f_A + f_1 + \frac{f_o}{c} V_D\right)t.$$

The microwave local oscillator signal $V_{105}$ is also heterodyned with the reference frequency antenna signal $V_{101}$ in balanced mixer 47. The signals produced by the microwave section 33

$V_{107} = K\, a(t)\, [\cos 2\pi f_A t]$ $V_{108} = K\, e_y a(t)\, [\cos 2\pi f_A t]$ $V_{109} = K\, e_p a(t)\, [\cos 2\pi f_A t]$ $V_{110} = K\, a_{21}(t)\, [\sin 2\pi(f_A)]$ K = constant associated with mixing process.

It is noted that practical balanced mixers will also produce harmonic frequencies of those frequencies expressed in $V_{107}$, $V_{108}$, $V_{109}$, $V_{110}$. However, as will be evident, these harmonics will be rejected and therefore may be neglected.

The signals produced by the microwave section 33 are processed by the narrow band filter section 34. The narrow band filter section is comprised of preamplifiers 49, 50, 51 and narrow band filters 52, 53 and 54. The narrow band filters 52, 53, 54 may be crystal filters. The filters 52, 53 and 54 have their center frequency at $f_A$ and a bandwidth less than one KHZ wide and in any case much less than 2 $f_1$. Therefore, the signals passing through narrow band filter section 34 may be represented by $V_{111} = K\, a(t)\, \cos 2\pi f_A t$ $V_{112} = K\, e_y a(t)\, \cos 2\pi f_A t$ $V_{113} = K\, e_p a(t)\, \cos 2\pi f_A t$ The signals produced by the narrow band filter section 34 are processed by the amplitude modulation coding section 35. The signals $V_{111}$, $V_{112}$, $V_{113}$ are encoded into one signal, $V_{119}$, wherein the azimuth and elevation signals $V_{112}$ and $V_{113}$ appear in quadrature with each other and as sidebands to the sum signal $V_{111}$. This coding is performed specifically by: (1) mixing the signal produced by oscillator 55, $V_{114} = \cos 2\pi f_E t$, with the elevation difference signal, $V_{113}$, in balanced modulator 57; (2) phase shifting the signal generated by oscillator 55, $V_{114}$, 90° by means of quadrature generator 56, thereby producing $V_{115} = \sin 2\pi f_E t$; (3) mixing the signals $V_{115}$ and the azimuth difference signal $V_{112}$ in balanced modulators 58; (4) summing the signals produced by balanced modulators 57 and 58 (that is, $V_{117}$ and $V_{118}$) with the sum signal $V_{111}$ in summing networks 59 and 60 to produce the amplitude modulated signal $V_{119}$. The signals produced by balanced modulators 57 and 58 and summing networks 59 and 60 can be represented by:

$V_{116} = K_1 e_y a(t)\, [\sin 2\pi(f_A+f_E)t + \sin 2\pi(f_A-f_E)t]$ $V_{117} = K_1 e_p a(t)\, [\cos 2\pi(f_A+f_E)t + \cos 2\pi(f_A-f_E)t]$ $V_{118} = K_1 a(t)\, [e_y \sin 2\pi(f_A \pm f_E)t + e_p \cos 2\pi(f_A \pm f_E)t]$ $$V_{119} = K_1 a(t) \left[ \cos 2\pi f_A t + e \frac{y}{2} \sin 2\pi (f_A \pm f_E)t + e \frac{p}{2} \cos 2\pi (f_A \pm f_E)t \right] =$$

$$K_1 a(t) [1 + E \sin (2\pi f_E t + \psi)] \cos 2\pi f_A t \text{ where } E = \sqrt{e_p^2 + e_y^2} \; ; \; \psi = \tan^{-1} \frac{e_p}{e_y}$$

$K_1$ = constant associated with mixing process.

The higher frequency harmonics generated by modulators 57 and 58 are neglected as they are filtered by various processing elements such as the summing networks 59 and 60.

It is desirable that the frequency of the signal produced by oscillator 55, $f_E$, is greater than the bandwidth of narrow band filters 52, 53, 54 so that any interference received by target tracking antenna 40 which would appear in the frequency region $f_E$ is rejected by narrow band filters 52, 53, 54 and will not interfere directly with the coded angle data.

The signal $V_{119}$ produced by amplitude modulation section 35 is processed by the receiver gain normalization section 36 where the azimuth and elevation difference signals are maintained at a constant relationship relative to the sum signal over the field signal dynamic range. The gain of I.F. amplifier 61 is controlled by the output signal of AGC amplifier 62. The resulting AGC loop 63 should respond only to the level of the sum signal $K_1 a(t)$, that is, on the carrier signal $V_{111}$ for small off target tracking antenna boresight angles. This time response characteristic of the AGC loop can be realized by correct frequency shaping of the AGC loop. A frequency conversion of the signal produced by I.F. amplifier 61, that is signal $V_{120} = \cos 2\pi f_A t[1 + E \sin (2\pi f_E t + \psi)]$, is performed by heterodyning it with the output signal of oscillator 64, $V_{122} = \cos 2\pi f_F t$, in balanced mixer 65 thereby producing a signal $V_{121}$ which can be represented by:

$$V_{121} = \cos 2\pi (f_A \pm f_F)t \; [1 + E \sin (2\pi f_E t + \psi)].$$

The oscillator 64 is typically a crystal controlled oscillator.

The signal $V_{121}$ is processed by I.F. amplifier 66 which has its bandpass at a center frequency of $f_A - f_F$ and a bandwidth such as to significantly filter frequencies in the range of $f_A + f_E$. Therefore, I.F. amplifier 66 produces a signal $F_{123}$ which can be represented as $V_{123} = \cos 2\pi (f_A - f_F)t \; [1 + E \sin (2\pi f_E t + \psi)]$.

The signal produced by the receiver gain normalization section 36, $V_{123}$, is then processed by amplitude detection section 37. In the embodiment shown, this detection process is performed by: (1) narrow band filtering the signal $V_{123}$ in filter 67 so as to produce a signal $V_{124}$ which can be represented $V_{124} = \cos 2\pi (f_A - f_E)t$, and (2), heterodyning signal $V_{124}$ with signal $V_{123}$ in balanced mixer 68 and filtered in low pass filter 69 to produce a signal $V_{126}$ which can be represented by $$V_{126} = 1 + E \sin (2\pi f_E t + \psi)$$

The quadrature detection section 38 then processes signal $V_{126}$ in a manner to extract the azimuth angle data and the elevation angle data for use by the guidance system, 16. The detection process is performed by: Heterodyning signal $V_{126}$ with the signal produced by oscillator 55, $V_{114}$, in balanced mixer 70, thereby producing a signal $V_{127}$ which can be represented by $$V_{127} = \cos 2\pi f_E t + K_2 E \; [\sin 4 \pi f_E t + \sin \psi];$$

where $K_2$ is a constant associated with the mixing process and heterodyning signal $V_{126}$ with the signal from quadrature generator 56, $V_{115}$, in balanced mixer 71, thereby producing a signal $V_{128}$ which can be represented by $$V_{128} = \sin 2\pi f_E t + K_2 E \; [\cos \psi - \cos 4\pi f_E t]$$

where $K_2$ is a constant associated with the mixing process. The signals $V_{127}$, $V_{128}$ are processed by amplifiers 72, 73 which each have a gain of $1/K_2$ and bandwidths which attenuate frequencies of $f_E$ and larger. Consequently, the signals produced by the quadrature detection section $V_{129}$ and $V_{130}$ can be represented as:

$$V_{129} = E \sin \psi = e_p$$

$$V_{130} = E \cos \psi = e_y$$

The Doppler and reference frequency tracking loop section 39 maintains track of the Doppler shift frequency $f_0 V_D/c$ and transmission frequency, $f_0$, essentially as previously described in reference to FIG. 2. The frequency of signal $V_{124}$ is detected by control discriminator 74. The output of discriminator 74 is used as the frequency control signal for voltage controlled oscillator 75. The nominal signal produced by voltage control oscillator 75, $V_{131}$, when discriminator 74 is operating at its center frequency, as previously discussed, can be expressed as $$V_{131} = \sin 2\pi (f_B + f_0 V_D/c)t$$

For reasons discussed in reference to FIG. 2, signal $V_{131}$ is translated in frequency by oscillator 81 and balanced mixer 76. The signal generated by oscillator 81, $V_{135}$, can be expressed as $$V_{135} = \cos 2\pi f_G t$$

Therefore, the signal produced by balanced mixer 76, $V_{133}$, which can be expressed as $$V_{133} = K_4 [\sin 2\pi (f_B + f_G + f_0 V_D/c)t + \sin 2\pi (f_B - f_G + f_0 V_D)t]$$

where $K_4$ is a constant associated with the mixing process. The signal $V_{133}$ is processed by I.F. amplifier 77 to filter unwanted harmonics and thereby produces a signal $V_{133}$ which can be expressed as $$V_{134} = K_4 \sin 2\pi (f_B + f_G + f_0 V_D/c)t$$

For reason evident shortly, $f_B$ and $f_G$ are selected such that $$f_A = f_B + f_G$$

The signal $V_{110}$ produced by microwave section 33 is also processed by I.F. amplifier 80 in the Doppler and reference frequency tracking loop section 39. I.F. amplifier 80, which has a bandpass centered at frequency $f_A$ and bandwidth larger than $2[f_0(\max.) V_D(\max.)/c]$ as previously described in reference to FIG. 2, is AGC'd by amplifier 79, thereby generating a signal which can be represented by $$V_{132} = \sin 2\pi (f_A + f_0 V_D/c)t.$$

The signal $V_{132}$ is phase compared with the signal $V_{134}$ in phase comparator and shaping network (as described in reference to FIG. 2) 78 to thereby produce a voltage control signal for microwave local oscillator 43.

The signal $V_{131}$, as previously mentioned can be used to provide a measure of missile-target relative closing velocity. Therefore, $V_{131}$ can be expressed as $\sin 2\pi(f_B + f_0 V_D/c)t$ and by heterodyning this signal with a signal at a frequency $f_B$, $V_D$ can be determined and used for processing by the guidance system 16. This processing is not shown.

The F.M. noise sidebands associated with microwave local oscillator 43 will be sufficiently suppressed by the reference frequency tracking loop 17 as discussed with reference to FIG. 2.

While the described embodiments of this invention are useful to an understanding thereof, it will be immediately apparent to those having ordinary skill in the art that other embodiments are also covered by the inventive concepts disclosed herein. Thus, it will be apparent that other techniques for coding monopulse data into a single channel, such as adding separate frequencies for azimuth and elevation angle data onto the carrier signal which represents the signal strength reference data, or time multiplexing with pulse radar systems by delaying azimuth angle data, elevation angle data and signal strength reference data. It is also apparent that active radar missile systems as well as a semiactive radar system can use this invention if appropriate transmitter/-receiver isolation is provided. It is also apparent that a conical scan system in place of the phase monopulse system described could incorporate the frequency processing system employed by the invention. Also, amplitude monopulse could be used in the embodiment described by appropriately changing the target tracking antenna to one suitable for amplitude monopulse. It is felt, therefore, that the invention should not be restricted to its disclosed embodiments but rather should be limited only by the spirit and scope of the following claims.

What is claimed is:

1. In a semiactive guidance and control system whereby a missile, in accordance with radar signals received directly from a radar transmitter and in accordance with echo signals reflected from a target, is directed to an intercept with such target, a receiver comprising:
   (a) front antenna means and rear antenna means mounted in the missile for receiving, respectively, echo signals from the target and radar signals from the radar transmitter;
   (b) a front heterodyne receiver channel means, including a first mixer connected to the front antenna means, for producing intermediate frequency signals corresponding to echo signals received by the front antenna means;
   (c) a rear heterodyne receiver channel means, including a second mixer connected to the rear antenna means, for producing intermediate frequency signals corresponding to radar signals received by the rear antenna means;
   (d) a local oscillator means, connected to the first and the second mixer, for producing common local signals therefore; and,
   (e) phase sensitive means, responsive to the difference in phase between the intermediate frequency signals from the front heterodyne receiver channel means and the intermediate frequency signals from the rear heterodyne receiver channel means, for controlling the frequency of the local oscillator, wherein the phase sensitive means comprises:
      (i) first discriminator means, having an input and an output, the input responsive to the intermediate frequency signals from the front heterodyne receiver channel means, for detecting changes in the frequency of the intermediate frequency signals from the front heterodyne receiver channel means;
      (ii) voltage controlled oscillator means, having an input and an output, the input responsive to the output of the first discriminator means, for providing an output signal having a fixed known frequency varied by a target doppler frequency;
      (iii) a reference oscillator means for providing a reference oscillator signal;
      (iv) third mixer means, responsive to the output signal from the voltage controlled oscillator means and to the reference oscillator signal, for producing signals having a frequency equal in frequency of the intermediate frequency signals of the rear heterodyne receiver channel means; and
      (v) phase comparator means, responsive to signals from the third mixer means and the intermediate frequency signals of the rear heterodyne receiver channel means, for producing signals for controlling the local oscillator.

2. A guidance system for a missile comprising:
   (a) a local oscillator having an output port and a control port;
   (b) a front receiver channel having a first mixer, the first mixer having a first and second input port and an output port, the first input port of the first mixer coupled to the output port of the local oscillator;
   (c) a rear receiver channel having a second mixer, the second mixer having a first and second input port and an output port, the first input port of the second mixer coupled to the output port of the local oscillator; and
   (d) means, coupled to the output of the first mixer and to the output of the second mixer, for providing a control signal to the control port of the local oscillator, wherein the providing means comprises:
      (i) a reference oscillator having an output port;
      (ii) a third mixer having a first and second input port and an output port, the first input port of the third mixer coupled to the output port of the reference oscillator;
      (iii) a phase discriminator having a first and second input port and an output port, the first input port coupled to the output of the third mixer, the second input port coupled to the output of the rear receiver channel and the output port coupled to the control port of the local oscillator;
(iv) a voltage controlled oscillator having an input port and an output port, the output port of the voltage controlled oscillator coupled to the second input port of the third mixer; and
(v) a discriminator, having an input and an output, the input responsive to signals from the front receiver channel and the output coupled to the input port of the voltage controlled oscillator.

3. A guidance system for a missile comprising:
(a) oscillator means for providing a local oscillator signal having a frequency;
(b) first means, coupled to the oscillator means, for providing a first intermediate frequency signal, the first intermediate frequency signal indicative of echo signals reflected from a target;
(c) second means, coupled to the oscillator means, for providing a second intermediate frequency signal having a frequency, the second intermediate frequency signal indicative of radar signals transmitted from a radar transmitter; and
(d) means, responsive to the first intermediate frequency signal and the second intermediate frequency signal, for providing a control signal to control the frequency of the local oscillator signal, wherein the control signal providing means comprises:
(i) discriminator means, responsive to the first intermediate frequency signal, for providing an output signal indicative of changes in frequency of the first intermediate frequency signal;
(ii) voltage controlled oscillator means, responsive to the output signal of the discriminator means, for providing an output signal having a fixed known frequency varied by a target doppler frequency;
(iii) means for providing a reference oscillator signal;
(iv) mixer means, responsive to the reference oscillator signal and the output signal of the voltage controlled oscillator means, for providing a signal having a frequency equal to the frequency of the second intermediate frequency signal; and
(v) phase discriminator means, responsive to the signal from the mixer means and the second intermediate frequency signal, for providing a control signal for controlling the frequency of the local oscillator signal.

* * * * *